United States Patent
Nagata et al.

(10) Patent No.: US 9,560,213 B2
(45) Date of Patent: Jan. 31, 2017

(54) VEHICLE COMMUNICATION SYSTEM, ON-BOARD UNIT, RECORDING MEDIUM AND COMMUNICATION METHOD

(71) Applicant: MITSUBISHI HEAVY INDUSTRIES MECHATRONICS SYSTEMS, LTD., Hyogo (JP)

(72) Inventors: Takeshi Nagata, Tokyo (JP); Yoshifumi Hayakawa, Tokyo (JP); Hisaji Takeuchi, Tokyo (JP); Jun Yasui, Tokyo (JP); Hideaki Murata, Tokyo (JP)

(73) Assignee: MITSUBISHI HEAVY INDUSTRIES MECHATRONICS SYSTEMS, LTD., Hyogo (JP)

( * ) Notice: Subject to any disclaimer, the term of this patent is extended or adjusted under 35 U.S.C. 154(b) by 17 days.

(21) Appl. No.: 14/655,333

(22) PCT Filed: Dec. 26, 2013

(86) PCT No.: PCT/JP2013/084814
§ 371 (c)(1),
(2) Date: Jun. 25, 2015

(87) PCT Pub. No.: WO2014/104168
PCT Pub. Date: Jul. 3, 2014

(65) Prior Publication Data
US 2015/0358481 A1    Dec. 10, 2015

(30) Foreign Application Priority Data
Dec. 28, 2012   (JP) ................................. 2012-288825

(51) Int. Cl.
H04M 15/00      (2006.01)
H04W 72/00      (2009.01)
(Continued)

(52) U.S. Cl.
CPC ............... *H04M 15/68* (2013.01); *H04W 4/04* (2013.01); *H04W 72/005* (2013.01);
(Continued)

(58) Field of Classification Search
CPC ...................................................... H04M 15/68
See application file for complete search history.

(56) References Cited

U.S. PATENT DOCUMENTS 9,319,933 B2*    4/2016  Alexander .......... H04W 72/082
2010/0248672 A1*  9/2010  Orlik ...................... H04B 7/086
                                                                455/277.2
(Continued)

FOREIGN PATENT DOCUMENTS

JP    2000-165314 A    6/2000
JP    2002-204200 A    7/2002
(Continued)

OTHER PUBLICATIONS

International Search Report mailed Mar. 18, 2014, corresponding to International application No. PCT/US2013/084814.
(Continued)

*Primary Examiner* — John Blanton
(74) *Attorney, Agent, or Firm* — Kanesaka Berner & Partners

(57) ABSTRACT

A communication system includes an on-board unit adapted to a vehicle-vehicle communication and roadside equipment 10 performing a roadside-vehicle communication. In communications in service channels of the vehicle-vehicle communication, one reception-only service channel in which the on-board unit only performs a reception operation is provided for a plurality of the service channels and communications in the reception-only service channel is performed at the same frequency as that of the control channels of the roadside-vehicle communication. When the vehicle-vehicle
(Continued)

communication is performed, the on-board unit performs switching to the roadside-vehicle communication in response to detection of reception in the reception-only service channel of a radio signal transmitted from the roadside equipment 10 in a control channel of the roadside-vehicle communication.

10 Claims, 16 Drawing Sheets

(51) Int. Cl.
  *H04W 4/04* (2009.01)
  *H04W 72/04* (2009.01)
  *G07B 15/06* (2011.01)

(52) U.S. Cl.
  CPC ....... *G07B 15/063* (2013.01); *H04W 72/0446* (2013.01); *H04W 72/0453* (2013.01)

(56) References Cited

U.S. PATENT DOCUMENTS

2010/0272004 A1* 10/2010 Maeda .................. H04L 5/0007
  370/312
2012/0188964 A1* 7/2012 Zhang ............... H04W 72/0406
  370/329
2015/0282210 A1* 10/2015 Li ....................... H04W 74/004
  455/436

FOREIGN PATENT DOCUMENTS

| | | |
|---|---|---|
| JP | 2009-232065 A | 10/2009 |
| JP | 2010-239607 A | 10/2010 |
| WO | 2011/026611 A1 | 3/2011 |

OTHER PUBLICATIONS

Takeshi Yamamoto, "The core of the wireless broadband overturn the common sense of communication", Nikkei Communications, Sep. 15, 2006, No. 470, pp. 98-103.

Decision to Grant a Patent in Singapore Patent Application No. 11201504929Q, mailed Feb. 1, 2016.

International Preliminary Report on Patentability mailed Jul. 9, 2015, corresponding to International application No. PCT/JP2013/084814.

Decision to Grant a Patent in JP Patent Application No. 2012-288825, mailed Dec. 7, 2016.

* cited by examiner

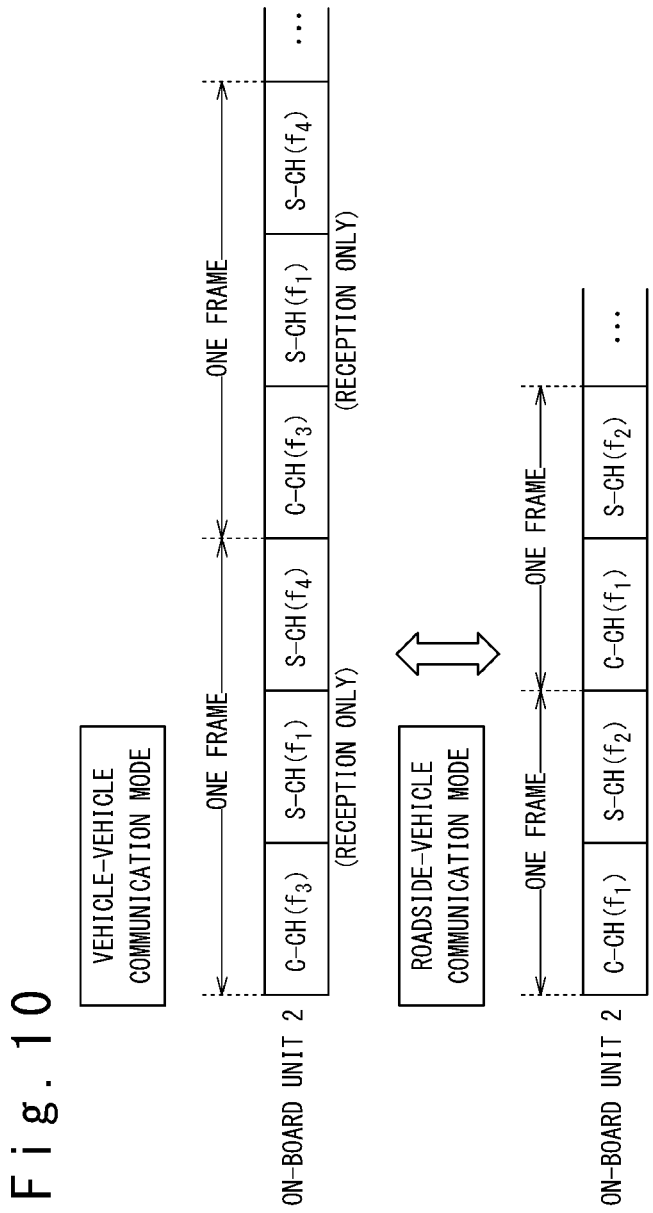

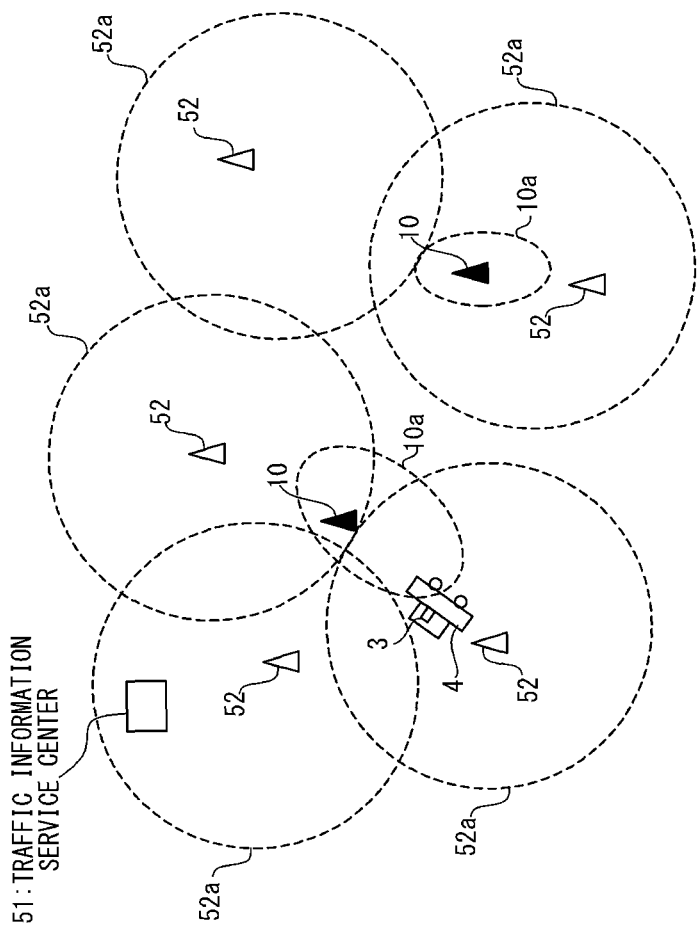

VEHICLE COMMUNICATION SYSTEM, ON-BOARD UNIT, RECORDING MEDIUM AND COMMUNICATION METHOD

RELATED APPLICATIONS

The present application is a National Phase of International Application Number PCT/JP2013/084814, filed Dec. 26, 2013, and claims priority of Japanese Patent Application No. 2012-288825 filed on Dec. 28, 2012.

TECHNICAL FIELD

The present invention relates to a vehicle communication system, on-board unit, recording medium and communication method, more particularly, to a vehicle communication system configured to offer multiple services to an on-board unit and an on-board unit, recording medium and communication method used in the same.

BACKGROUND ART

In the field of the intelligent transport system (ITS), WAVE (wireless access in vehicular environment) has been proposed as a communication standard for offering various services to an on-board unit (or a vehicle mounting the on-board unit). WAVE, which is a modification of the wireless LAN standard, IEEE 802.11, for a mobile communication, uses IEEE 802.11p in layer 1 (physical layer) and layer 2 (data link layer). One feature of WAVE is that a distributed coordination function (DCF), in which transmission opportunity is equally allocated to each terminal, is performed. In detail, each communication frame is divided into a plurality of time slots each called "channel" in WAVE. Each communication frame includes one control channel and at least one service channel. Broadcasting is performed in a control channel and a communication for transmitting data to a specific destination is performed in a service channel. A source communication terminal desiring data transmission specifies a destination communication terminal and a service channel to be used for the data transmission in a control channel. The destination communication terminal receives data from the source communication terminal in the specified service channel. Multiple services are time-divisionally offered in parallel by alternately repeating communications in the control channels and communications in the service channels. It should be noted that patent literature 1 (Japanese patent application publication No. 2010-239607 A) discloses a technique related to WAVE.

FIG. 1, which is an illustration schematically illustrating one example of communications in accordance with WAVE, illustrates one example of a communication procedure for offering two services A and B to communication terminal #1. In FIG. 1, communication terminal #2 is a communication terminal which offers service A and communication terminal #3 is a communication terminal which offers service B.

Discussed below is an example in which communication terminal #1 transmits data indicating to perform communications for service A and specifying a service channel in which a response is to be done, in a control channel of communication frame #k through broadcasting. Communication terminal #2, which offers service A, transmits data to communication terminal #1 in a service channel in response to the data transmitted by communication terminal #1. Although communication terminal #2 transmits the data in the next service channel, that is, the service channel of communication frame #k in the example of FIG. 1, communication terminal #2 may transmit the data in a service channel other than in the next service channel. Communication terminal #3, with which no communication is requested, does not issue a response even when receiving the data from communication terminal #1 through broadcasting. Further discussed below is the case when communication terminal #1 transmits data indicating to perform communications for service B and specifying a service channel in which a response is to be done, in a control channel of communication frame #k+1 through broadcasting. In this case, communication terminal #3, which offers service B, transmits data to communication terminal #1 in a service channel in response to the data transmitted by communication terminal #1. Multiple services are offered to communication terminal #1 in this way.

One issue is that, in order to achieve switching between multiple services, the respective services are required to use a common frequency for communications in the control channels, whereas the use of the common frequency may cause radio-wave interference due to multipath phasing and overlapping of the communicable regions of antennas, when multiple communication terminals performs broadcasting in a control channel at the same time. The occurrence of radio-wave interference may cause a failure in data communications in a control channel and resultingly cause a failure of switching between services.

FIG. 2 is a diagram illustrating an example of occurrence of radio-wave interference in offering a vehicle-vehicle communication service and a roadside-vehicle communication service to an on-board unit 102. As illustrated in FIG. 2, a gantry 113 is disposed across a road 111, and roadside communication devices 101-1 to 101-4 are respectively disposed for respective lanes 112 on the gantry 113. An on-board unit 102, which is mounted on a vehicle 103, functions as a mobile station moving with the vehicle 103. The numerals 104-1 to 104-4 respectively denote the communicable regions of the roadside communication devices 101-1 to 101-4 and the numeral 105 denotes the communicable region of the on-board unit 102.

Discussed below is the case when an on-board unit 102 which has been performing a vehicle-vehicle communication with another on-board unit (not illustrated) enters any of the communicable regions of the roadside communication devices 101-1 to 101-4 and it has become a situation to start a roadside-vehicle communication between the on-board unit 102 and the roadside communication devices 101-1 to 101-4. In other words, there arises a necessity of switching the on-board unit 102 from the state of performing the vehicle-vehicle communication to the state of performing the roadside-vehicle communication. Such situation may occur, for example, when the roadside communication devices 101-1 to 101-4 are used in an electronic toll collection (ETC) system and it is necessary to communicate with the roadside communication devices 101-1 to 101-4 for toll charging.

In this case, radio-wave interference may occur, since the communicable regions 104-1 to 104-4 of the roadside communication devices 101-1 to 101-4 overlap the communicable region 105 of the on-board unit 102. In FIG. 2, the region in which radio-wave interference may occur is denoted by the numeral 106.

FIG. 3 is a conceptual illustration illustrating an example in which a communication in a control channel results in failure due to radio-wave interference and switching from the vehicle-vehicle communication to the roadside-vehicle communication thereby results in failure. In the operation illustrated in FIG. 3, control channels (C-CHs) of the same frequency are used for both of the vehicle-vehicle communication and the roadside-vehicle communication. It should be noted that, in FIG. 3, service channel #1 (S-CH#1) is used for the roadside-vehicle communication (communications between the on-board unit 102 and the roadside communication devices 101-1 to 101-4). Service channel #2 (S-CH#2) is, on the other hand, used for the vehicle-vehicle communication (communications between the on-board unit 102 and another on-board unit (not illustrated)).

The roadside communication devices 101-2 and 101-3 try to transmit data to request communications using the service channel #1 to the on-board unit 102 through broadcasting in a control channel. In the meantime, the on-board unit 102 may try to transmit data for the vehicle-vehicle communication to another on-board unit through broadcasting in a control channel of the same frequency. In this case, the on-board unit 102 may fail in reception of data transmitted from the roadside communication devices 101-2 and 101-3 in a control channel due to radio-frequency interference. This may result in that service channels #2 (S-CH#2) are continuously used by the on-board unit 102 and the service channels used by the on-board unit 102 are not switched to service channels #1, that is, switching from the vehicle-vehicle communication to the roadside-vehicle communication results in failure.

From the background described above, there is a need for providing a technology for performing switching between multiple services with radio-wave interference suppressed.

It should be noted that patent literature 2 (Japanese patent application publication No. 2000-165314 A) discloses a technique, which may relate to the present invention, for providing a vehicle-vehicle communication scheme for performing communications between mobile stations without causing disturbance on a roadside-vehicle communication.

CITATION LIST

Patent Literature

[Patent Literature 1] Japanese Patent Application Publication No. 2010-239607 A
[Patent Literature 2] Japanese Patent Application Publication No. 2000-165314 A

SUMMARY OF THE INVENTION

Therefore, an objective of the present invention is to provide a technology for performing switching between multiple services with radio-wave interference suppressed when the multiple services are offered to an on-board unit.

In one aspect of the present invention, a communication system includes an on-board unit, a first communication device performing a communication with the on-board unit for a first service, and a second communication device performing a communication with the on-board unit for a second service. In communications for both of the first and second services, each communication slot includes one control channel in which broadcasting is performed and at least one service channel for data transmission to a specific destination. Communications in the control channels of the communications for the first service are performed at a first frequency, and communications in the service channels of the communications for the first service are performed at a second frequency which is different from the first frequency. Communications in the control channels of the communications for the second service are performed at a third frequency which is different from both of the first and second frequencies. With respect to communications in the service channels of the communications for the second service, one reception-only service channel in which the on-board unit only performs a reception operation is provided for a plurality of the service channels and communications in the reception-only service channel is performed at the first frequency, whereas communications in the remaining service channels are performed at a fourth frequency which is different from all of the first, second and third frequencies. When a communication for the second service is performed, the on-board unit performs switching to a communication for the first service in response to detection of reception in the reception-only service channel of a radio signal transmitted from the first communication device in the control channel of the communication for the first service.

To surely perform switching from a communication for the second service to a communication for the first service, it is preferable that the length of periods of the service channels of the communications for the second service is controlled to be variable.

In one embodiment, the communications for the first service are roadside-vehicle communications, and the communications for the second service are vehicle-vehicle communications. In an alternative embodiment, the first service is a traffic information service which offers traffic information to the on-board unit, and the second service is an accounting service which achieves electronic payment of a fee charged to a user of the on-board unit.

In another aspect of the present invention, an on-board unit includes a radio circuit configured to perform communications with a first communication device for a first service and communications with a second communication device for a second service and a control unit. In communications for both of the first and second services, each communication slot includes one control channel in which broadcasting is performed and at least one service channel in which a transmission to a specific destination is performed. Communications in the control channels of the communications for the first service are performed at a first frequency, and communications in the service channels of the communications for the first service are performed at a second frequency which is different from the first frequency. Communications in the control channels of the communications for the second service are performed at a third frequency which is different from both of the first and second frequencies. With respect to communications in the service channels of the communications for the second service, one reception-only service channel in which the on-board unit only performs a reception operation is provided for a plurality of the service channels and communications in the reception-only service channel is performed at the first frequency, whereas communications in the remaining service channels are performed at a fourth frequency which is different from all of the first, second and third frequencies. When a communication for the second service is performed, the control unit controls the radio circuit to perform switching to a communication for the first service in response to detection of reception in the reception-only service channel of a radio signal transmitted from the first communication device in the control channel of the communication for the first service.

In still another aspect of the present invention, a communication method includes: performing communications for a first service between an on-board unit and a first communication unit; and performing communications for a second service between an on-board unit and a second communication unit. In communications for both of the first and second services, each communication slot includes one control channel in which broadcasting is performed and at least one service channel in which a transmission to a specific destination is performed. Communications in the control channels of the communications for the first service are performed at a first frequency, and communications in the service channels of the communications for the first service are performed at a second frequency which is different from the first frequency. Communications in the control channels of the communications for the second service are performed at a third frequency which is different from both of the first and second frequencies. With respect to communications in the service channels of the communications for the second service, one reception-only service channel in which the on-board unit only performs a reception operation is provided for a plurality of the service channels and communications in the reception-only service channel is performed at the first frequency, whereas communications in the remaining service channels are performed at a fourth frequency which is different from all of the first, second and third frequencies. When a communication for the second service is performed, switching to a communication for the first service is performed in response to detection of reception by the on-board unit in the reception-only service channel of a radio signal transmitted from the first communication device in the control channel of the communication for the first service.

In still another aspect of the present invention, a program is provided for controlling an on-board unit configured to perform communications with a first communication device for a first service and communications with a second communication device for a second service. In communications for both of the first and second services, each communication slot includes one control channel in which broadcasting is performed and at least one service channel in which a transmission to a specific destination is performed. Communications in the control channels of the communications for the first service are performed at a first frequency, and communications in the service channels of the communications for the first service are performed at a second frequency which is different from the first frequency. Communications in the control channels of the communications for the second service are performed at a third frequency which is different from both of the first and second frequencies. With respect to communications in the service channels of the communications for the second service, one reception-only service channel in which the on-board unit only performs a reception operation is provided for a plurality of the service channels and communications in the reception-only service channel is performed at the first frequency, whereas communications in the remaining service channels are performed at a fourth frequency which is different from all of the first, second and third frequencies. The program causes the on-board unit to, when a communication for the second service is performed, perform switching to a communication for the first service in response to detection of reception in the reception-only service channel of a radio signal transmitted from the first communication device in the control channel of the communication for the first service. The program may be recorded in a recording medium.

The above-described embodiments allows providing a technology for performing switching between multiple services with suppressed radio-wave interference, the multiple services being offered to an on-board unit.

BRIEF DESCRIPTION OF DRAWINGS

FIG. 10 is an illustration illustrating a modification of the communication frame format of radio signals transmitted and received by the on-board unit;

FIG. 12 is a conceptual illustration illustrating an example of the configuration of a communication system in a second embodiment;

DESCRIPTION OF EMBODIMENTS

First Embodiment

Figure 1:
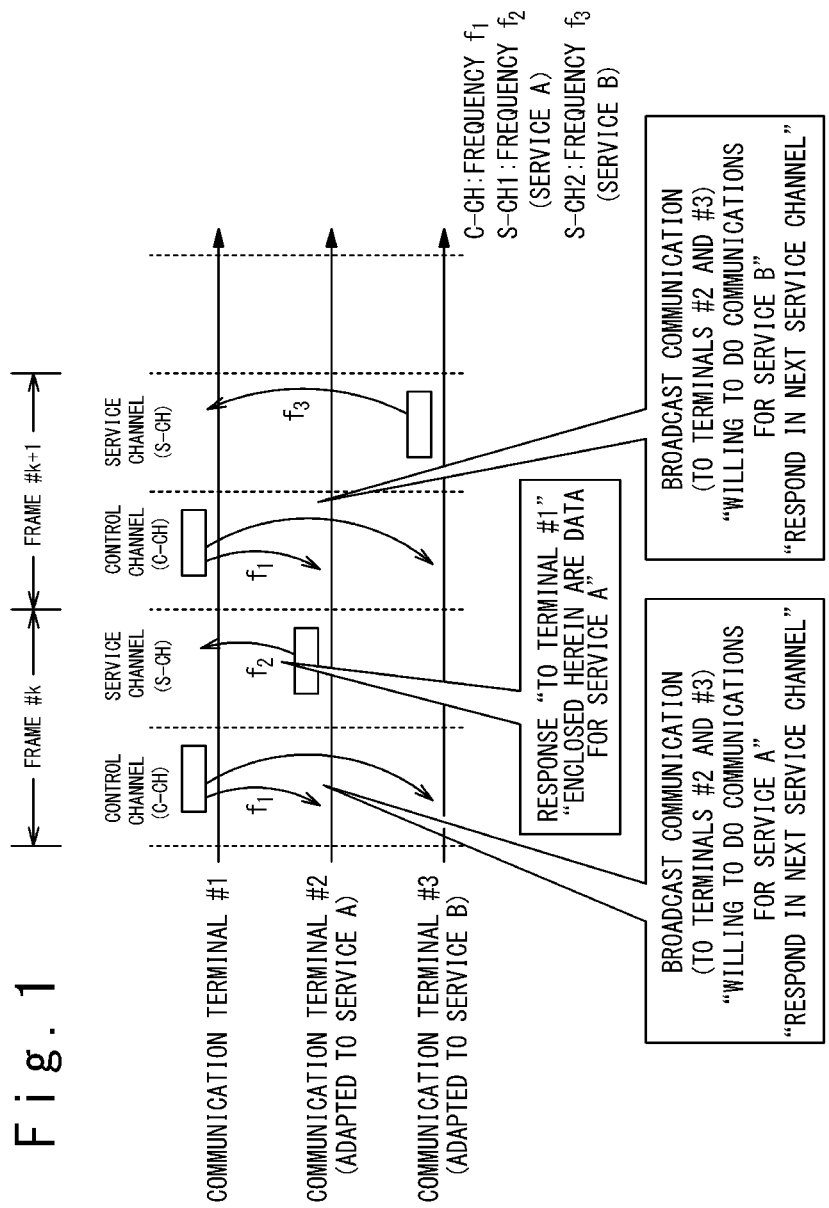
FIG. 1 is an illustration schematically illustrating one example of communications in accordance with the WAVE communication standard.
Figure 2:
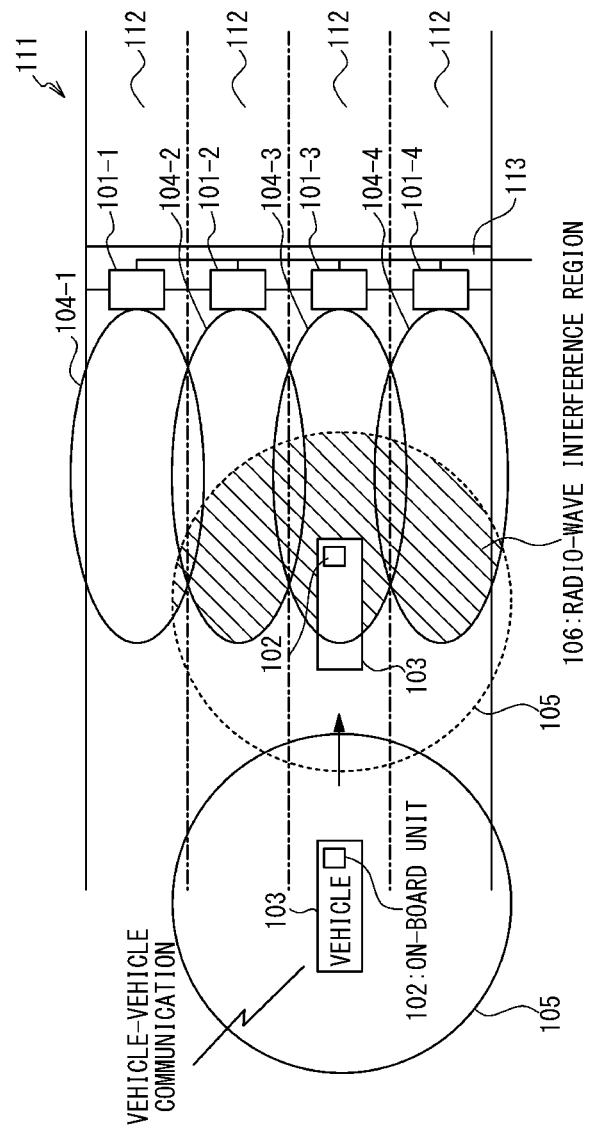
FIG. 2 is an illustration illustrating an example of the configuration of a communication system which supports the WAVE communication standard, and occurrence of radio-wave interference in offering a plurality of services to an on-board unit in the communication system.
Figure 3:
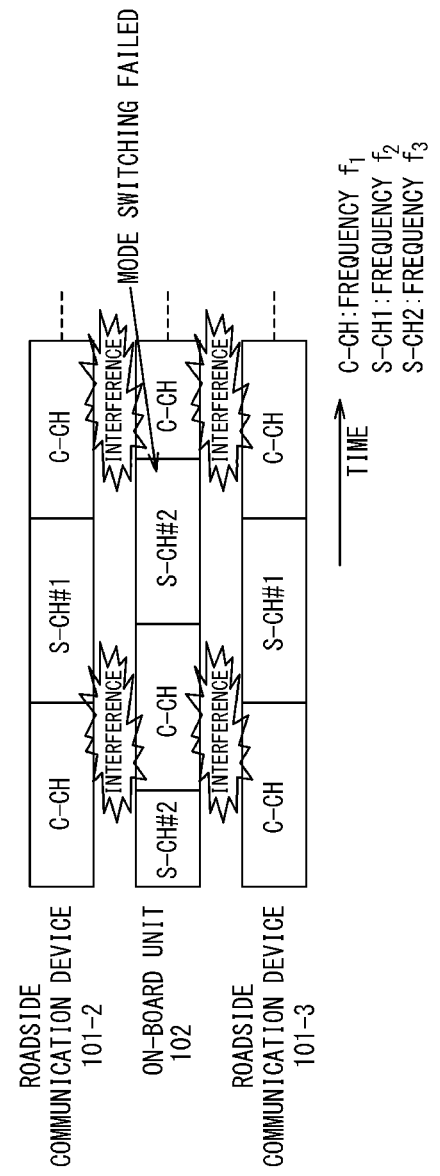
FIG. 3 is an illustration illustrating occurrence of radio-wave interference in offering a plurality of services to an on-board unit in the WAVE communication standard.
Figure 4:
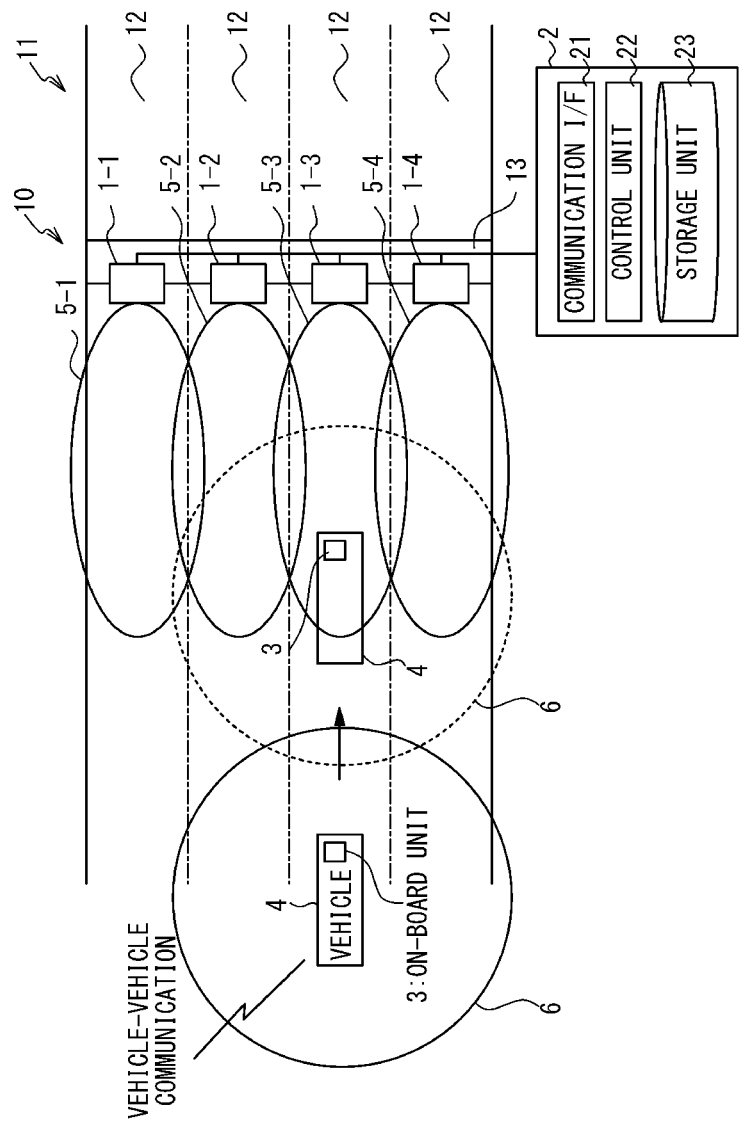
FIG. 4 is a conceptual illustration illustrating an example of the configuration of a communication system in a first embodiment of the present invention.

FIG. 4 is a conceptual illustration illustrating one example of a communication system in a first embodiment of the present invention. Presented in the present embodiment is a communication system configured to offer both of a vehicle-vehicle communication service and a roadside-vehicle communication service to a vehicle 4 on which an on-board unit 3 is mounted. In the vehicle-vehicle communication, communications between the on-board unit 3 and a different on-board unit (not illustrated) are performed. It should be noted that respective on-board units operate as equivalent communication devices (communication terminals) in the vehicle-vehicle communication and therefore the different on-board unit has a similar configuration to the on-board unit 3 and operates in a similar way. In the roadside-vehicle communication, on the other hand, communications between the on-board unit 3 and roadside equipment 10 are performed.

The roadside equipment 10 includes roadside communication devices 1-1 to 1-4 and a roadside control device 2. The roadside communication devices 1-1 to 1-4 are mounted on a gantry 13 disposed across a road 11, and have the function of transmitting radio signals to and receiving radio signals from on-board units 3 mounted on vehicles 4 respectively driving on corresponding lanes 12. The roadside control device 2 generates data to be transmitted from the roadside communication devices 1-1 to 1-4 to an on-board unit 3 with a radio signal and processes data received from the on-board unit 3 to the roadside communication devices 1-1 to 1-4 with a radio signal. In FIG. 4, the numerals 5-1 to 5-4 denote the communicable regions of the roadside communication devices 1-1 to 1-4, and the numeral 6 denotes the communicable region of an on-board unit 3.

The roadside control device 2 includes a communication interface 21, a control unit 22 and a storage unit 23. The communication interface 21 is connected with the roadside communication devices 1-1 to 1-4 and has the function of transmitting data to be transmitted to an on-board unit 3 to appropriate one of the roadside communication devices 1-1 to 1-4 and receiving data transmitted from the on-board unit 3 to the roadside communication devices 1-1 to 1-4. The control unit 22 generates data to be transmitted from the roadside communication devices 1-1 to 1-4 to an on-board unit 3 and processes data received from the on-board unit 3 to the roadside communication devices 1-1 to 1-4 with a radio signal. A processor such as a CPU (central processing unit) may be used as the control unit 22. The storage unit 23 stores therein data necessary for the roadside-vehicle communication. The function of the roadside control device 2 may be achieved by executing software programs stored in the storage unit 23 by the control unit 22.

Figure 5:
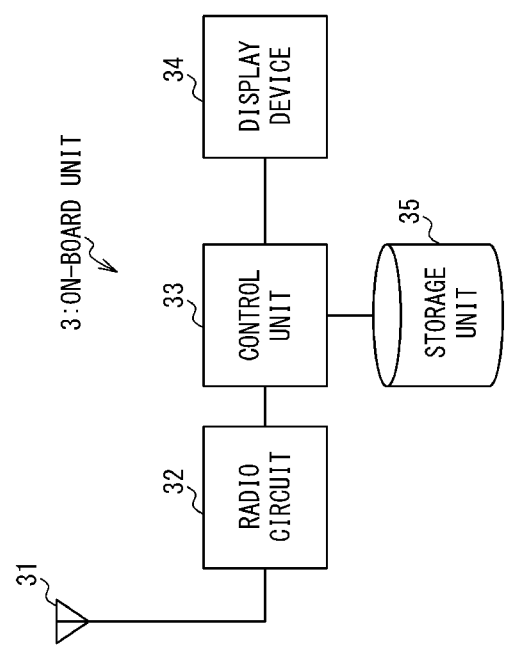
FIG. 5 is a block diagram illustrating an example of the configuration of an on-board unit.

FIG. 5 illustrates an example of the configuration of an on-board unit 3. The on-board unit 3 includes an antenna 31, a radio circuit 32, a control unit 33, a display device 34 and a storage unit 35. The antenna 31 has the function of receiving radio signals transmitted from the roadside communication devices 1-1 to 1-4 and transmitting radio signals to the roadside communication devices 1-1 to 1-4. The radio circuit 32 generates reception data by demodulating the radio signals transmitted to the antenna 31 from the roadside communication devices 1-1 to 1-4, generates a radio signal by modulating transmission data received from the control unit 33 and transmits the generated radio signal to the roadside communication devices 1-1 to 1-4 via the antenna 31. The control unit 33 processes the reception data received from the radio circuit 32 and generates transmission data to be transmitted to the roadside communication devices 1-1 to 1-4 to feed to the radio circuit 32. The control unit 33 also has the function of controlling the radio circuit 32 in performing the vehicle-vehicle communication and the roadside-vehicle communication, more particularly, the function of controlling the frequency at which the radio circuit 32 performs the communications. Additionally, the control unit 33 has the function of transmitting to the display device 34 information to be displayed on the display device 34. The display device 34 functions as a user interface which displays information to be presented to the user under the control of the control unit 33 in performing the vehicle-vehicle communication and the roadside-vehicle communication. The function of the on-board unit 3 may be achieved by executing software programs stored in the storage unit 35 by the control unit 33. Install of the software programs onto the storage unit 35 may be achieved with a recording medium recording the software programs.

Figure 6:
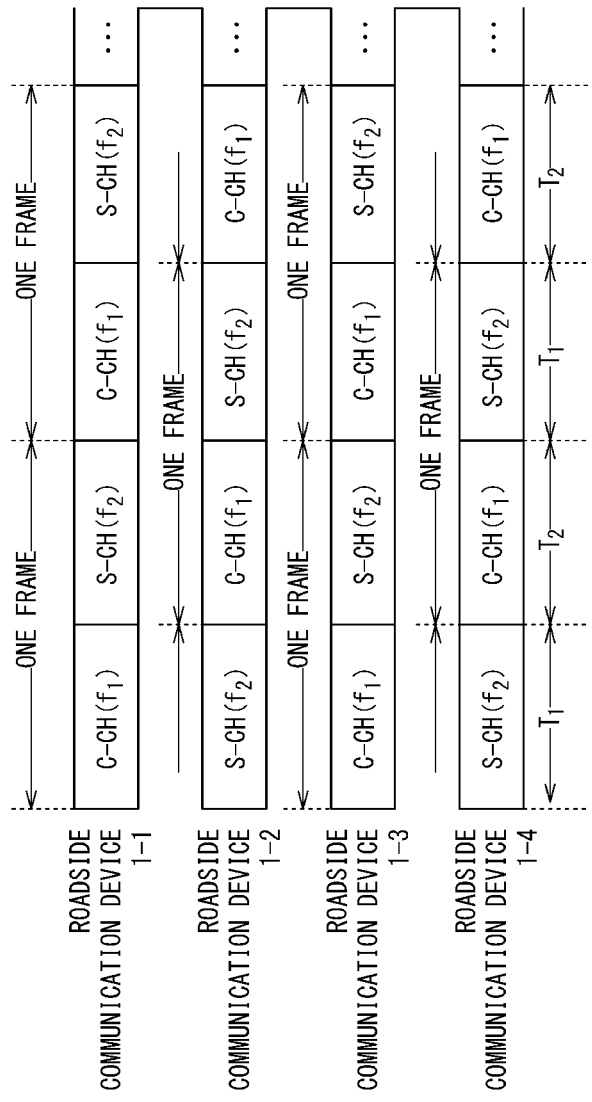
FIG. 6 is a conceptual illustration illustrating the communication frame format of radio signals transmitted and received by roadside communication devices (that is, the communication frame format of a roadside-vehicle communication) in the first embodiment.

FIG. 6 is a conceptual illustration illustrating the communication frame format of radio signals transmitted and received by the roadside communication devices 1-1 to 1-4 of the roadside equipment 10, that is, the communication frame format of the roadside-vehicle communication. The roadside-vehicle communication is performed in accordance with the WAVE communication standard and each communication frame includes one control channel (C-CH) and at least one service channel (S-CH). Although FIG. 6 illustrates the case when each communication frame consists of one control channel and one service channel, the configuration of each communication frame is not limited to this configuration. As described above, the control channel is a channel in which broadcasting is performed, and the service channel is a channel in which a communication with a specific destination is performed. It should be noted here that communications in the control channels of the roadside-vehicle communication are performed at a frequency $f_1$, and communications in the service channels of the roadside-vehicle communication are performed at a frequency $f_2$ which is different from the frequency $f_1$.

In the present embodiment, as illustrated in FIG. 6, the times when respective communication frames of the roadside-vehicle communication are started are different between adjacent two roadside communication devices 1. In other words, the periods in which communications in the control channels are performed and the periods in which communications in the service channels are performed are different between the communications between the odd-numbered roadside communication devices 1-1, 1-3 and an on-board unit 3 and the communications between the even-numbered roadside communication devices 1-2, 1-4 and the on-board unit 3.

Details are as follows: With respect to the communications between the odd-numbered roadside communication devices 1-1, 1-3 and the on-board unit 3, the periods in which communications in the control channels are performed are referred to as periods $T_1$, and the periods in which communications in the service channels are performed are referred to as periods $T_2$. This means that the communication frames in the communications between the odd-numbered roadside communication devices 1-1, 1-3 and the on-board unit 3 start at the beginnings of the periods $T_1$.

On the other hand, the communication frames in the communications between the even-numbered roadside communication devices 1-2, 1-4 and the on-board unit 3 start at the beginnings of the periods $T_2$. In other words, in the communications between the even-numbered roadside communication devices 1-2, 1-4 and the on-board unit 3, communications in the control channels are performed in periods $T_2$ and communications in the service channels are performed in periods $T_1$ following the periods $T_2$.

Performing communications between the roadside communication devices 1-1 to 1-4 and the on-board unit 3 in this timing reduces radio-wave interference between adjacent roadside communication devices 1.

Figure 7:
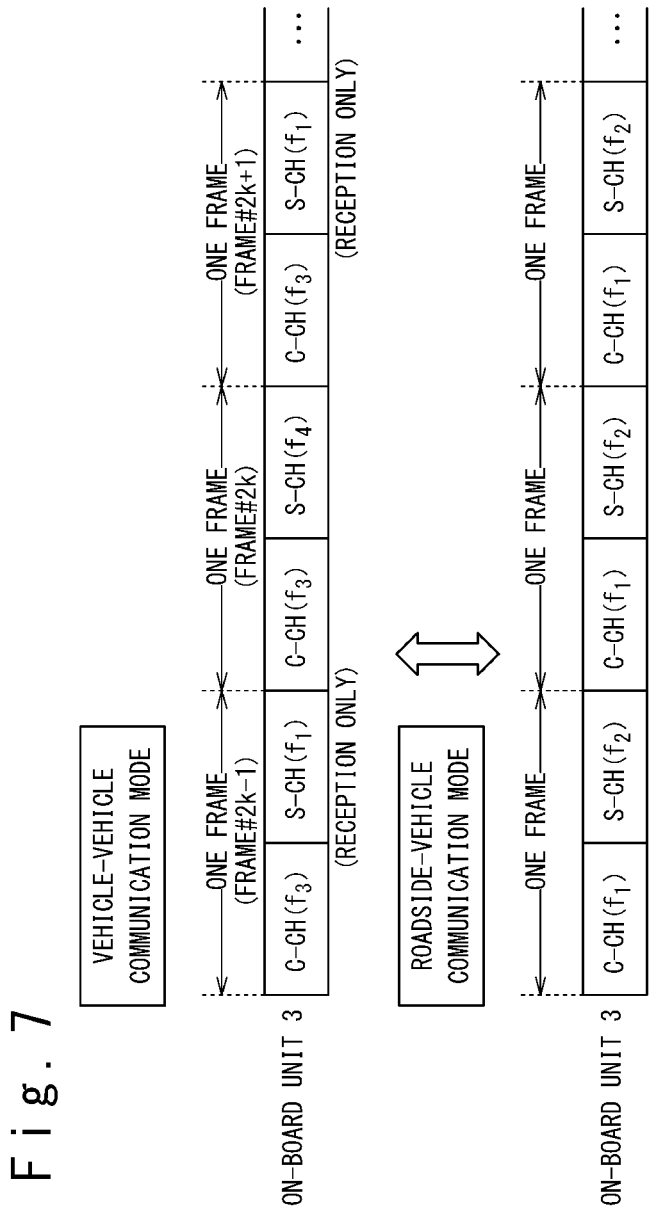
FIG. 7 is a conceptual illustration illustrating the communication frame format of radio signals transmitted and received by the on-board unit (that is, the communication frame format of a vehicle-vehicle communication) in the first embodiment.

FIG. 7 is a conceptual illustration illustrating the communication frame format of radio signals transmitted and received by an on-board unit 3. The on-board unit 3 has two operation modes: a vehicle-vehicle communication mode and a roadside-vehicle communication mode, where the vehicle-vehicle communication mode is an operation mode in which the vehicle-vehicle communication is performed and the roadside-vehicle communication mode is an operation mode in which the roadside-vehicle communication is performed. Both of the vehicle-vehicle communication and the roadside-vehicle communication are performed in accordance with the WAVE communication standard, and each communication frame includes one control channel (C-CH) and at least one service channel (S-CH) in both of the operation modes. Attention should be paid here to the fact that the frequency used for the communications in the control channels and the frequency used for the communications in the service channels are different between the vehicle-vehicle communication mode and the roadside-vehicle communication mode.

First, the communications in the control channels in the vehicle-vehicle communication are performed at a frequency $f_3$ which is different from both of the above-described frequencies $f_1$ and $f_2$. It should be noted that the frequency $f_3$ used in the communications in the control channels in the vehicle-vehicle communication is different from the frequency $f_1$ used in the communications in the control channels in the roadside-vehicle communication.

The communications in the service channels in the vehicle-vehicle communication are performed at the frequency $f_1$ or $f_4$, where the frequency $f_4$ is different from all of the frequency $f_1$ used in the communications in the control channels of the roadside-vehicle communication, the frequency $f_2$ used in the communications in the service channels of the roadside-vehicle communication and the frequency $f_3$ used in the communications in the control channels of the vehicle-vehicle communication. It should be noted that the frequency $f_1$ is the frequency used in the communications in the control channels of the roadside-vehicle communication as described above.

In the vehicle-vehicle communication, one service channel in which a communication is performed at the frequency $f_1$ is provided for every predetermined number of service channels, the predetermined number being equal to or more than two, and the on-board unit 3 only performs a reception operation (that is, does not transmit a radio signal) in the service channels in which communications are performed at the frequency $f_1$. In the present embodiment, in which the number of service channel included in each communication frame is one, a service channel in which a communication is performed at the frequency $f_1$ and the on-board unit 3 only performs a reception operation is provided in one communication frame for every predetermined number of communication frames, the predetermined number being equal to or more than two. In the example of FIG. 7, a service channel in which a communication is performed at the frequency $f_1$ and the on-board unit 3 only performs a reception operation is provided in communication frames #2k−1 and #2k+1, while a service channel in which a communication is performed at the frequency $f_4$ is provided in communication frame #2k. As described later, in the case when each communication frame include multiple service channels, one of the multiple service channels in each communication frame may be defined as a service channel in which a communication is performed at the frequency $f_1$ and the on-board unit 3 only performs a reception operation.

The above-described communication frame configuration used in the vehicle-vehicle communication is of importance for preventing radio-wave interference in the control channels between the roadside-vehicle communication and the vehicle-vehicle communication, as described later.

In the roadside-vehicle communication mode, on the other hand, the communication frame configuration is defined to match the roadside-vehicle communication illustrated in FIG. 6. Each communication frame includes one control channel and at least one service channel. The communications in the control channels in the roadside-vehicle communication are performed at the frequency $f_1$, and the communications in the service channels in the roadside-vehicle communication are performed at the frequency $f_2$, which is different from the frequency $f_1$.

Figure 8:
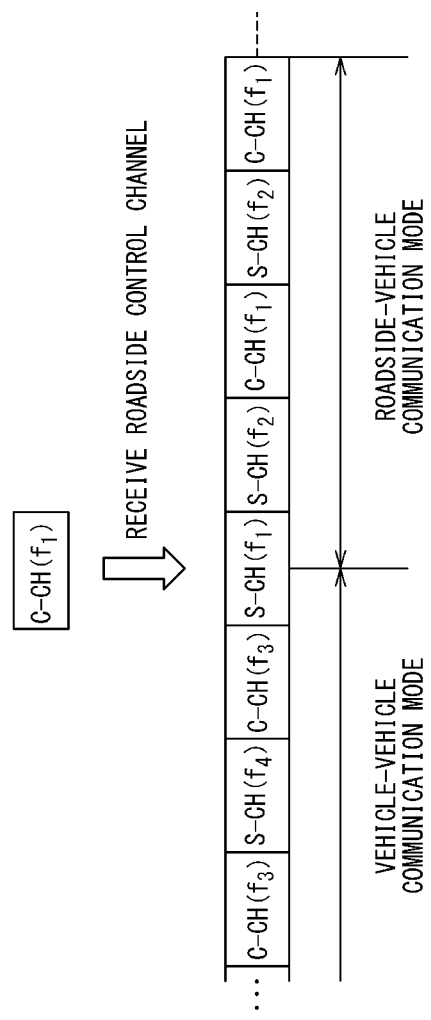
FIG. 8 is an illustration illustrating the procedure of switching from the vehicle-vehicle communication to the roadside-vehicle communication in the first embodiment.

FIG. 8 is an illustration illustrating the procedure of switching from the vehicle-vehicle communication to the roadside-vehicle communication. In a normal state, the on-board unit 3 operates in the vehicle-vehicle communication mode to achieve the vehicle-vehicle communication. In other words, the radio circuit 32 performs communications in the control channels at the frequency $f_3$ and performs communications in the service channels at the frequency $f_1$ or $f_4$. It should be noted here that the on-board unit 3 only performs a reception operation in the service channels in which a communication is performed at the frequency $f_1$.

When the on-board unit 3 enters any of the communicable regions 5-1 to 5-4 of the roadside communication devices 1-1 to 1-4, switching from the vehicle-vehicle communication to the roadside-vehicle communication is performed. In detail, when the on-board unit 3 enters any of the communicable regions 5-1 to 5-4 of the roadside communication devices 1-1 to 1-4, the radio circuit 32 of the on-board unit 3 starts receiving a radio signal from the roadside communication devices 1-1 to 1-4. It should be noted that, since the communications in the control channels in the roadside-vehicle communication is performed at the frequency $f_1$, it is possible to receive a radio signal of a control channel of the roadside-vehicle communication in a service channel of the vehicle-vehicle communication, in which service channel a communication is performed at the frequency $f_1$.

When detecting a reception of a radio signal in a control channel of the roadside-vehicle communication in a service channel in which a communication is performed at the frequency $f_1$, the control unit 33 of the on-board unit 3 switches the on-board unit 3 from the vehicle-vehicle communication mode to the roadside-vehicle communication mode and causes the radio circuit 32 to start the roadside-vehicle communication. After necessary data exchanges are completed in the roadside-vehicle communication, the on-board unit 3 returns from the roadside-vehicle communication mode to the vehicle-vehicle communication mode to restart the vehicle-vehicle communication. When the roadside-vehicle communication is used for toll collection, for example, the vehicle-vehicle communication is restarted after data exchanges for the toll collection are completed.

As described above, in the present embodiment, switching from the vehicle-vehicle communication to the roadside-vehicle communication is successfully achieved, since the on-board unit 3 can receive a radio signal transmitted by the roadside communication devices 1-1 to 1-4 in a service channel in which a communication is performed at the frequency $f_1$. Furthermore, since the frequencies used in communications in the control channels are different between the vehicle-vehicle communication and the roadside-vehicle communication and the on-board unit 3 only performs a reception operation in the service channels in which communications are performed at the frequency $f_1$, radio-wave interference is effectively avoided between a radio signal transmitted in a control channel by the on-board unit 3 and a radio signal transmitted in a control channel by the roadside communication device 1-1 to 1-4.

It should be noted that the communication frame formats in the roadside-vehicle communication and the vehicle-vehicle communication may be variously modified.

Figure 9:
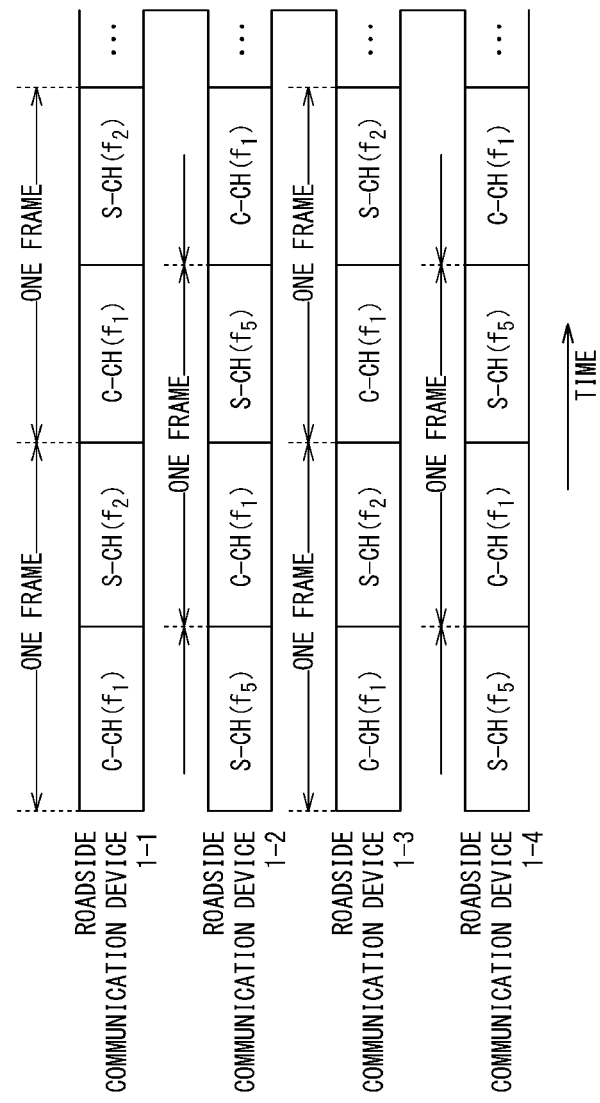
FIG. 9 is a conceptual illustration illustrating a modification of the communication frame format of radio signals transmitted and received by the roadside communication devices.

For example, FIG. 9 illustrates a modification of the communication frame format of radio signals transmitted and received by the roadside communication devices 1-1 to 1-4 of the roadside equipment 10 (that is, the communication frame format of the roadside-vehicle communication). In the communication frame format illustrated in FIG. 9, similarly to that illustrated in FIG. 6, the periods of the control channels and the service channels are different between adjacent roadside communication devices 1. Specifically, the roadside communication devices 1-2 and 1-4 perform communications in service channels in the periods $T_4$ in which the roadside communication devices 1-1 and 1-3 perform communications in control channels, whereas the roadside communication devices 1-2 and 1-4 perform communications in control channels in the periods $T_2$ in which the roadside communication devices 1-1 and 1-3 perform communications in service channels. It should be noted here that the roadside communication devices 1-1 and 1-4 commonly use the frequency $f_1$ for communications in the control channels.

Additionally, in the communication frame format illustrated in FIG. 9, the frequency used in communications in the service channels is different between adjacent roadside communication devices 1. More specifically, the frequency used by the roadside communication devices 1-1 and 1-3 in communications in the service channels is $f_2$, whereas the frequency used by the roadside communication devices 1-2 and 1-4 in communications in the service channels is $f_5$ which is different from all of the above-described frequencies $f_1$ to $f_4$. This format further effectively reduces radio-wave interference between adjacent roadside communication devices 1.

FIG. 10 is an illustration illustrating a modification of the communication frame format of the vehicle-vehicle communication. In the vehicle-vehicle communication, as described above, one service channel in which a communication is performed at the frequency $f_1$ (which is the same as the frequency used in the control channels of the roadside-vehicle communication as described above) and the on-board unit 3 only performs a reception operation is provided for every predetermined number of service channels, the predetermined number being equal to or more than two. In the communication frame format illustrated in FIG. 10, each communication frame of the vehicle-vehicle communication includes multiple service channels (two service channels in FIG. 10) and one service channel of each communication frame is defined as a service channel in which a communication is performed at the frequency $f_1$ and the on-board unit 3 only performs a reception operation. The use of this communication frame format also allows receiving communication data of a control channel of the roadside-vehicle communication in a service channel in which a communication is performed at the frequency $f_1$ and the on-board unit 3 only performs a reception operation, to thereby achieve switching from the vehicle-vehicle communication to the roadside-vehicle communication.

Figure 11A:
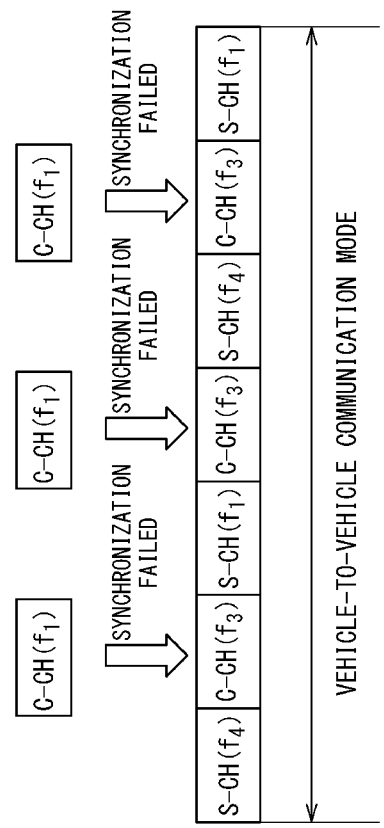
FIG. 11A is an illustration illustrating a problem which may occur when periods in which communications in the control channels of the roadside-vehicle communication are performed always fall within periods in which communications in the control channels of the vehicle-vehicle communication are performed.

The above-described switching procedure from the vehicle-vehicle communication to the roadside-vehicle communication may result in failure, depending on the timing of the control channels of the roadside-vehicle communication and the timing of the service channels of the vehicle-vehicle communication in which service channels communications are performed at the frequency $f_1$. For example, as illustrated in FIG. 11A, switching from vehicle-vehicle communication to the roadside-vehicle communication results in failure, in the case when periods in which communications in the control channels of the roadside-vehicle communication are performed always fall within periods in which communications in the control channels of the vehicle-vehicle communication are performed. Such situation may occur, for instance, if the cycle period of communications in the control channels of the roadside-vehicle communication is an integral multiplication (including one time) of that of communications in the control channels of the vehicle-vehicle communication, and the length of the periods in which communications in the control channels of the roadside-vehicle communication are performed is equal to or shorter than that of the periods in which communications in the control channels of the vehicle-vehicle communication are performed. It should be noted that such situation may accidentally occur even if the vehicle-vehicle communication is not synchronous with the roadside-vehicle communication.

Figure 11B:
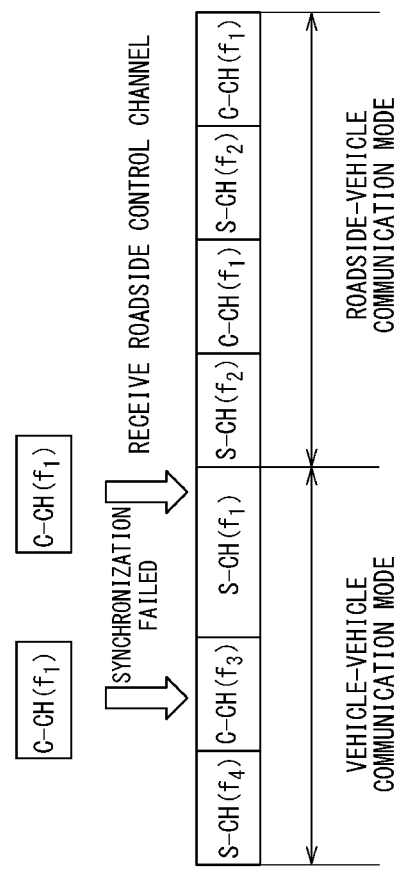
FIG. 11B is a conceptual illustration illustrating switching from the vehicle-vehicle communication to the roadside-vehicle communication in the case when the length of periods of the service channels of the vehicle-vehicle communication is variable.

In order to avoid such problem, as illustrated in FIG. 11B, the length of the periods in which communications in the service channels of the vehicle-vehicle communication are performed may be controlled so that the length of the periods in which communications in the service channels of the vehicle-vehicle communication are performed is variable. Such control may be performed by the radio circuit 32 under the control of the control unit 33. Most simply, a random scan may be performed for respective service channels of the vehicle-vehicle communication, that is, the length of the periods in which communications in the service channels of the vehicle-vehicle communication are performed may be randomly varied. This effectively avoids occurrence of an event in which the periods in which communications in the control channels of the vehicle-vehicle communication are performed accidentally coincide with the periods in which communications in the control channels of the roadside-vehicle communication are performed and accordingly switching from the vehicle-vehicle communication to the roadside-vehicle communication results in failure.

Second Embodiment

FIG. 12 is a conceptual illustration illustrating one example of a communication system in a second embodiment of the present invention. The second embodiment is directed to a communication system which offers both of a traffic information service and an accounting service, whereas the first embodiment is directed to a communication system which offers both of a vehicle-vehicle communication service and a roadside-vehicle service. Here, the traffic information service is a service which offers a variety of information related to the traffic (which may simply referred to as traffic information) to an on-board unit 3 (and a device connected with the on-board unit 3). The accounting service is, on the other hand, a service which achieves electronic payment of a fee charged to a user of a vehicle 4 on which the on-board unit 3 is mounted (for example, a toll of a toll road and a parking fee).

Figure 13:
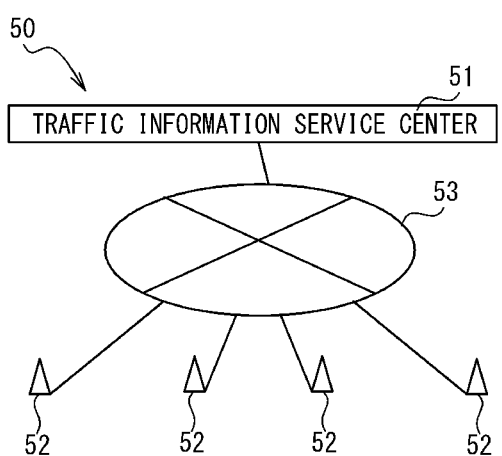
FIG. 13 is a conceptual illustration illustrating an example of the configuration of a traffic information service network.

A traffic information service center 51 and roadside communication devices 52 are used to offer the traffic information service. As illustrated in FIG. 13, the traffic information service center 51 and the roadside communication devices 52 are connected via a communication network 53 to form a traffic information service network 50 which offers the traffic information service. The traffic information service center 51 is a host computer which offers traffic information to the on-board unit 3 via the roadside communication devices 52. Examples of the traffic information offered to the on-board unit 3 in the traffic information service may include traffic jam information, emergency vehicle approach information, accident information, weather information, traffic regulation information, advertisement information and news information.

On the other hand, the roadside equipment 10 described in the first embodiment is used to offer the accounting service. In other words, the roadside-to-side communication described in the first embodiment is used to offer the accounting service. As described in the first embodiment, the roadside equipment 10, which includes roadside communication devices 1-1 to 1-4 and a roadside control device 2, is configured to communicate with the on-board unit 3 by using the roadside communication devices 1-1 to 1-4 (see FIG. 4). Examples of information exchanged between the roadside equipment 10 and the on-board unit 3 may include vehicle type information (such as information indicating which of standard-sized vehicle, large-sized vehicle and motorcycle the vehicle 4 is to be classified as), accounting card information (the card type and number of a card inserted into the on-board unit 3) and accounting history information (history of accounting, including a start of charging and the like).

As understood from FIG. 12, the traffic information service offered by the traffic information service center 51 and the roadside communication devices 52 is a service offered across a relatively wide area (wide area service), whereas the accounting service offered by the roadside equipment 10 is a service offered in a limited area (local service). Accordingly, in a normal operation, the on-board unit 3 is placed in a traffic information service mode to receive the traffic information service. When the vehicle 4 enters a charging area, that is, the communicable regions 4-1 to 4-4 of the roadside communication devices 1-1 to 1-4, on the other hand, the on-board unit 3 is switched to the accounting service mode to receive the accounting service.

In the second embodiment, communications for the traffic information service and the accounting service are performed in accordance with the WAVE communication standard. In the communications performed in accordance with the WAVE communication standard, as described above, each communication frame includes one control channel (C-CH) and at least one service channel (S-CH). The communication frame format of the communications for the traffic information service is same as that of the vehicle-vehicle communication described in the first embodiment, whereas the communication frame format of the communications for the accounting service is same as that of the roadside-vehicle communication described in the first embodiment.

In detail, in offering the accounting service, the communication frame format of radio signals transmitted and received by the roadside communication devices 1-1 to 1-4 of the roadside equipment 10 (that is, the communication frame format of communications for the accounting service) is defined as illustrated in FIG. 6. The communications in the control channels for the accounting service is performed at the frequency $f_1$ and the communications in the service channels for the accounting service is performed at the frequency $f_2$, which is different from the frequency $f_1$.

Figure 14:
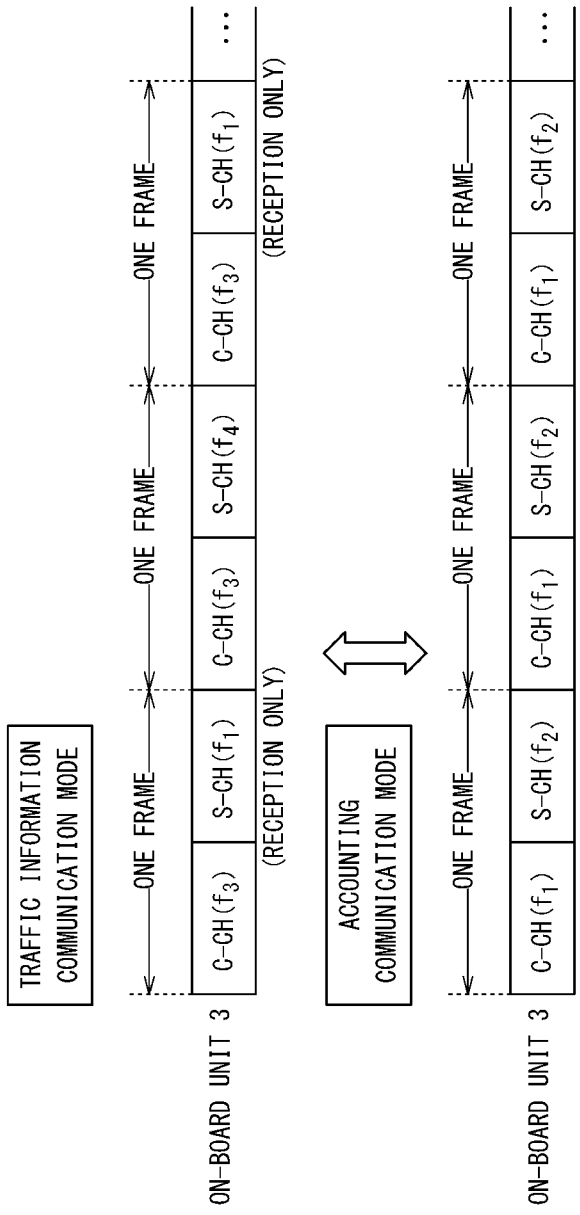
FIG. 14 is a conceptual illustration illustrating the communication frame format of radio signals transmitted and received by an on-board unit (that is, the communication frame format of communications for the traffic information service and the communication frame format of communications for an accounting service) in the second embodiment.

FIG. 14 is, on the other hand, a conceptual illustration illustrating the communication frame format of radio signals transmitted and received by the on-board unit 3 in the second embodiment. The on-board unit 3 has two operation modes: traffic information communication mode and accounting communication mode, where the traffic information communication mode is an operation mode in which communications for the traffic information service are performed and the accounting communication mode is an operation mode in which communications for the accounting service are performed. The frequencies used in communications in the control channels and the frequencies used in communications in the service channels are different between the traffic information communication mode and the accounting communication mode.

First, communications in the control channels in the traffic information communication mode are performed at the frequency $f_3$, which is different from both of the above-described frequencies $f_1$ and $f_2$. It should be noted here that the frequency $f_3$ used in communications in the control channel in the traffic information communication mode is different from the frequency $f_1$ used in communications in the control channel in the accounting service.

Communications in the service channels in the traffic information communication mode are, on the other hand, performed at the frequency $f_1$ or $f_4$, where the frequency $f_4$ is different from all of the frequency $f_1$ used in communications of the control channels in the accounting communication mode, the frequency $f_2$ used in communications of the service channels in the accounting communication mode and the frequency $f_3$ used in communications of the control channels in the traffic information communication mode. It should be noted that the frequency $f_1$ is the frequency of the control channels in the above-described accounting communication mode.

As is the case with the vehicle-vehicle communication in the first embodiment, in the traffic information communication mode, one service channel in which a communication is performed at the frequency $f_1$ is provided for every predetermined number of service channels, the predetermined number being equal to or more than two, and furthermore, the on-board unit 3 only performs a reception operation (does not transmit a radio signal) in the service channel in which a communication is performed at the frequency $f_1$. As is the case with the communication frame configuration of the vehicle-vehicle communication illustrated in FIG. 9, when each communication frame includes multiple service channels, one of the multiple service channels may be defined as a service channel in which a communication is performed at the frequency $f_1$ and the on-board unit 3 only performs a reception operation. The above-described communication frame configuration of the traffic information communication mode is of importance for avoiding radio-wave interference in control channels between communications for the traffic information service and communications for the accounting service.

In the accounting communication mode, on the other hand, the communication frame format of radio signals transmitted and received by the on-board unit 3 is defined to match the communication frame format of radio signals transmitted and received by the roadside communication devices 1-1 to 1-4 of the roadside equipment 10 (which is illustrated in FIG. 6). Communications in the control channels of the accounting communication mode are performed at the frequency $f_1$ and communications in the service channels of the accounting communication mode are performed at the frequency $f_2$, which is different from the frequency $f_1$.

Figure 15:
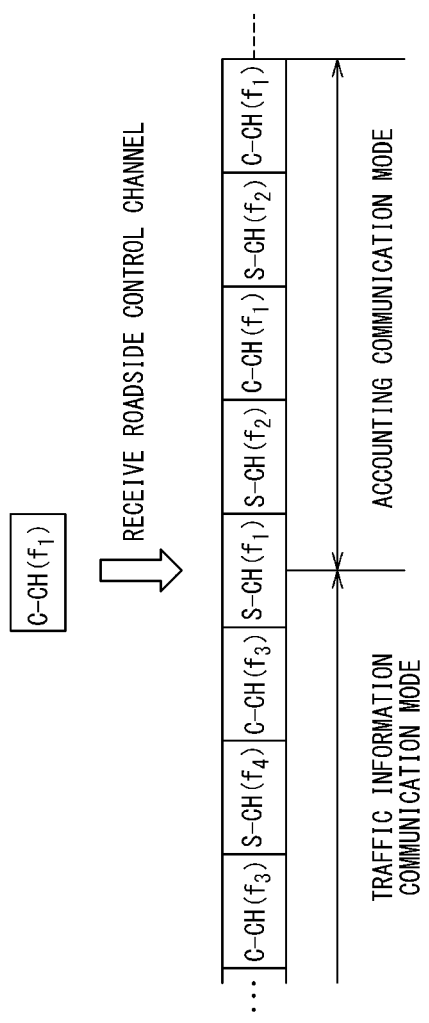
FIG. 15 is an illustration illustrating the procedure of switching from a communication for the traffic information service to a communication for the accounting service in the first embodiment.

FIG. 15 is an illustration illustrating the procedure of switching from a communication for the traffic information service to a communication for the accounting service. In a normal state, the on-board unit 3 operates in the traffic information communication mode, performing communications for the traffic information service. In other words, the on-board unit 3 performs communications in the control channels at the frequency $f_3$ and performs communications in the service channels at the frequency $f_1$ or $f_4$. It should be noted here that the on-board unit 3 only performs a reception operation in the service channels in which communications are performed at the frequency $f_1$.

When the on-board unit 3 enters any of the communicable regions 5-1 to 5-4 of the roadside communication devices 1-1 to 1-4 of the roadside equipment 10, switching from the traffic information communication mode to the accounting communication mode is performed. In detail, when entering any of the communicable regions 5-1 to 5-4 of the roadside communication devices 1-1 to 1-4, the on-board unit 3 starts to receive radio signals from the roadside communication devices 1-1 to 1-4. It should be note here that, since communications in the control channels for the traffic information service are performed at the frequency $f_1$, it is possible to receive radios signals of communications in the control channels for the traffic information service in the service channels in which communications are performed at the frequency $f_1$ for the accounting service.

When receiving a radio signal of a control channel of the roadside-vehicle communication in a service channel in which a communication is performed at the frequency $f_1$, the on-board unit 3 is switched from the traffic information communication mode to the accounting communication mode to start communications for the accounting service. After completing necessary data exchanges in communications for the accounting service, the on-board unit 3 returns to the traffic information communication mode from the accounting communication mode and restarts communications for the traffic information service.

As described above, in the present embodiment, the on-board unit 3 can receive a radio signal transmitted in control channels by the roadside communication devices 1-1 to 1-4 in a service channel in which a communication is performed at the frequency $f_1$, and this allows switching from a communication for the traffic information service to a communication for the accounting service.

Furthermore, since the frequency of communications in the control channels is different between the communications for the traffic information service and the communications for the accounting service and the on-board unit 3 only performs a reception operation in the service channels in which communications are performed at the frequency $f_1$, radio-wave interference does not occur between radio signals transmitted by the on-board unit 3 in the control channels and those transmitted by the roadside communication devices 1-1 to 1-4 in the control channels.

Although embodiments of the present invention are specifically illustrated in the above, the present invention is not limited to the above-described embodiments. It would be apparent to a person skilled in the art that the present invention may be implemented with various modifications. For example, although the above-described embodiments recite switching between the vehicle-vehicle communication and the roadside-vehicle communication and switching between the communication for the traffic information service and the communication for the accounting service, the present invention may be applied to switching between other services.

DESCRIPTION OF REFERENCE NUMERALS

1: roadside communication device
2: roadside control device
3: on-board unit
4: vehicle
5 and 6: communicable region
10: roadside equipment
11: road
12: lane
13: gantry
21: communication interface
22: control unit
23: storage unit
31: antenna
32: radio circuit
33: control unit
34: display device
35: storage unit
50: traffic information service network
51: traffic information service center
52: roadside communication device
53: communication network
$T_1$ and $T_2$: period
$f_1$, $f_2$, $f_3$, $f_4$ and $f_5$: frequency

The invention claimed is:

1. A communication system, comprising:
an on-board unit;
a first communication device performing communications with the on-board unit for a first service; and
a second communication device performing communications with the on-board unit for a second service,
wherein, in communications for both of the first and second services, each communication slot includes one control channel in which broadcasting is performed and at least one service channel in which a transmission to a specific destination is performed,
wherein communications in the control channels of the communications for the first service are performed at a first frequency,
wherein communications in the service channels of the communications for the first service are performed at a second frequency which is different from the first frequency,
wherein communications in the control channels of the communications for the second service are performed at a third frequency which is different from both of the first and second frequencies,
wherein, with respect to communications in the service channels of the communications for the second service, one reception-only service channel in which the on-board unit only performs a reception operation is provided for a plurality of the service channels and communications in the reception-only service channel is performed at the first frequency, whereas communications in the remaining service channels are performed at a fourth frequency which is different from all of the first, second and third frequencies, and wherein, when a communication for the second service is performed, the on-board unit performs switching to a communication for the first service in response to detection of reception in the reception-only service channel of a radio signal transmitted from the first communication device in the control channel of the communication for the first service.

2. The communication system according to claim 1, wherein a length of periods of the service channels of the communications for the second service is controlled to be variable.

3. The communication system according to claim 1, wherein the communications for the first service are roadside-vehicle communications, and
wherein the communications for the second service are vehicle-vehicle communications.

4. The communication system according to claim 1, wherein the first service is a traffic information service which offers traffic information to the on-board unit, and
wherein the second service is an accounting service which achieves electronic payment of a fee charged to a user of the on-board unit.

5. An on-board unit, comprising:
a radio circuit configured to perform communications with a first communication device for a first service and communications with a second communication device for a second service; and
a control unit,
wherein in communications for both of the first and second services, each communication slot includes one control channel in which broadcasting is performed and at least one service channel in which a transmission to a specific destination is performed,
wherein communications in the control channels of the communications for the first service are performed at a first frequency,
wherein communications in the service channels of the communications for the first service are performed at a second frequency which is different from the first frequency,
wherein communications in the control channels of the communications for the second service are performed at a third frequency which is different from both of the first and second frequencies,
wherein, with respect to communications in the service channels of the communications for the second service, one reception-only service channel in which the on-board unit only performs a reception operation is provided for a plurality of the service channels and communications in the reception-only service channel is performed at the first frequency, whereas communications in the remaining service channels are performed at a fourth frequency which is different from all of the first, second and third frequencies, and
wherein, when a communication for the second service is performed, the control unit controls the radio circuit to perform switching to a communication for the first service in response to detection of reception in the reception-only service channel of a radio signal transmitted from the first communication device in the control channel of the communication for the first service.

6. The on-board unit according to claim 5, wherein the control unit controls the radio circuit so that a length of periods of the service channels of the communications for the second service is variable.

7. The on-board unit according to claim 5, wherein the communications for the first service are roadside-vehicle communications, and
wherein the communications for the second service are vehicle-vehicle communications.

8. The on-board unit according to claim 5, wherein the first service is a traffic information service which offers traffic information to the on-board unit, and
wherein the second service is an accounting service which achieves electronic payment of a fee charged to a user of the on-board unit 3.

9. A communication method, comprising:
performing communications for a first service between an on-board unit and a first communication unit; and
performing communications for a second service between an on-board unit and a second communication unit,
wherein, in communications for both of the first and second services, each communication slot includes one control channel in which broadcasting is performed and at least one service channel in which a transmission to a specific destination is performed,
wherein communications in the control channels of the communications for the first service are performed at a first frequency,
wherein communications in the service channels of the communications for the first service are performed at a second frequency which is different from the first frequency,
wherein communications in the control channels of the communications for the second service are performed at a third frequency which is different from both of the first and second frequencies,
wherein, with respect to communications in the service channels of the communications for the second service, one reception-only service channel in which the on-board unit only performs a reception operation is provided for a plurality of the service channels and communications in the reception-only service channel is performed at the first frequency, whereas communications in the remaining service channels are performed at a fourth frequency which is different from all of the first, second and third frequencies, and
wherein, when a communication for the second service is performed, switching to a communication for the first service is performed in response to detection of reception by the on-board unit in the reception-only service channel of a radio signal transmitted from the first communication device in the control channel of the communication for the first service.

10. A recording medium recording a program for controlling an on-board unit configured to perform communications with a first communication device for a first service and communications with a second communication device for a second service,
wherein in communications for both of the first and second services, each communication slot includes one control channel in which broadcasting is performed and at least one service channel in which a transmission to a specific destination is performed,
wherein communications in the control channels of the communications for the first service are performed at a first frequency,
wherein communications in the service channels of the communications for the first service are performed at a second frequency which is different from the first frequency, wherein communications in the control channels of the communications for the second service are performed at a third frequency which is different from both of the first and second frequencies, wherein, with respect to communications in the service channels of the communications for the second service, one reception-only service channel in which the on-board unit only performs a reception operation is provided for a plurality of the service channels and communications in the reception-only service channel is performed at the first frequency, whereas communications in the remaining service channels are performed at a fourth frequency which is different from all of the first, second and third frequencies, and wherein, the program causes the on-board unit to, when a communication for the second service is performed, perform switching to a communication for the first service in response to detection of reception in the reception-only service channel of a radio signal transmitted from the first communication device in the control channel of the communication for the first service.

\* \* \* \* \*